United States Patent [19]

Sakai et al.

[11] Patent Number: 5,728,277
[45] Date of Patent: Mar. 17, 1998

[54] HYDROGEN OCCLUSION ELECTRODE

[75] Inventors: Tetsuo Sakai; Hiroyuki Takeshita; Hideaki Tanaka; Nobuhiro Kuriyama; Itsuki Uehara, all of Ikeda, Japan

[73] Assignee: Agency of Industrial Science & Technology, Tokyo, Japan

[21] Appl. No.: 831,747

[22] Filed: Apr. 1, 1997

[30] Foreign Application Priority Data

Apr. 5, 1996 [JP] Japan ................................. 8-110453

[51] Int. Cl.⁶ ................................................. C25B 11/04
[52] U.S. Cl. ........................... 204/293; 429/59; 429/101; 429/218; 420/417; 420/421; 420/900; 423/594; 423/598; 423/608
[58] Field of Search ..................... 420/900, 417, 420/421; 429/59, 101, 218; 423/594, 595, 598, 599, 608, 610, 644; 204/293

[56] References Cited

U.S. PATENT DOCUMENTS

| | | | |
|---|---|---|---|
| 4,363,706 | 12/1982 | Williams et al. | 204/293 |
| 4,997,492 | 3/1991 | Taki | 204/293 |
| 5,061,358 | 10/1991 | Nobuyoshi et al. | 204/293 |

*Primary Examiner*—Bruce F. Bell
*Attorney, Agent, or Firm*—Nikaido, Marmelstein, Murray & Oram LLP

[57] ABSTRACT

A hydrogen occlusion electrode comprising a compact of a mixture powder including a titanium-nickel alloy which contains oxygen.

7 Claims, 8 Drawing Sheets

A: Titanium phase containing oxygen in the form of solid solution (TiOa)

B: $Ti_2Ni$ phase which contains oxygen ($Ti_4Ni_2Ox$)

C: TiNi phase

FIG. 5
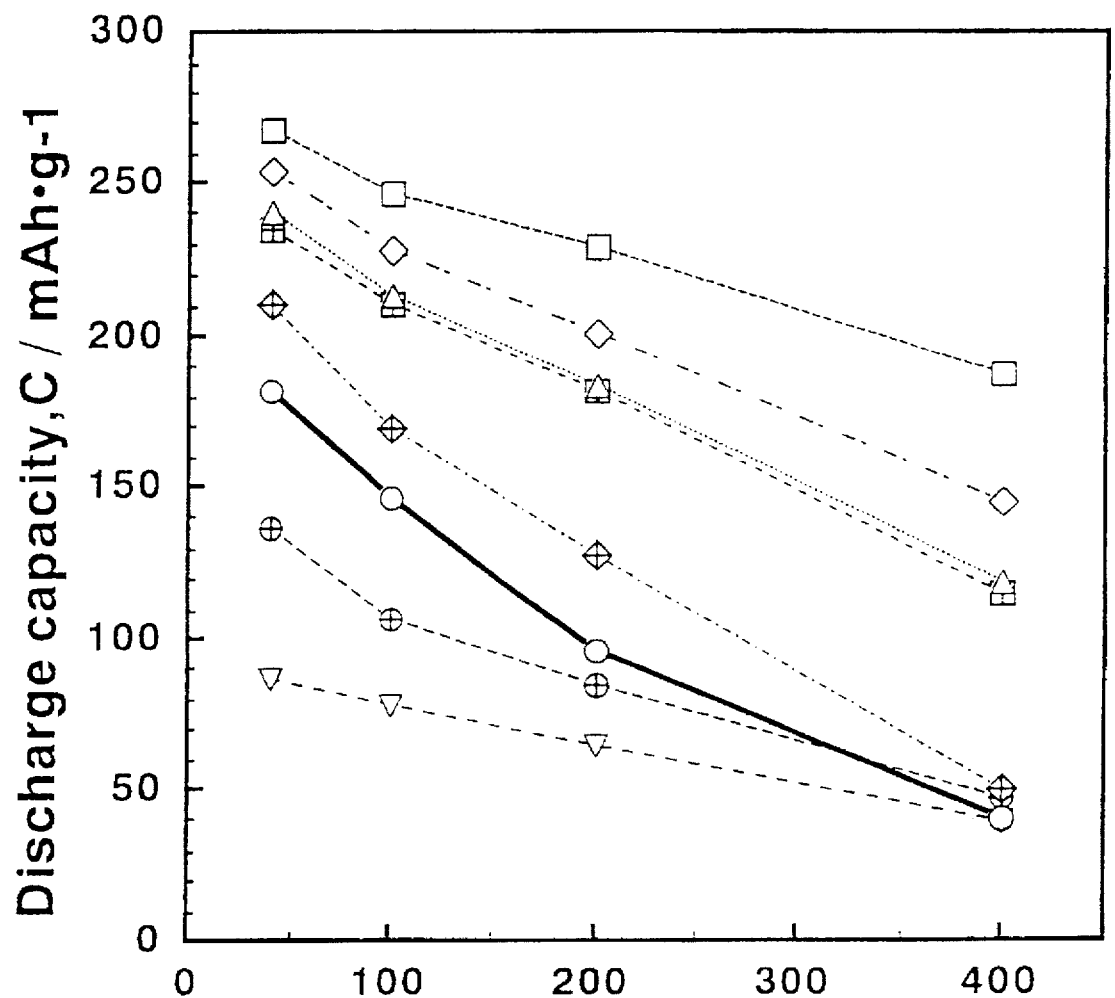
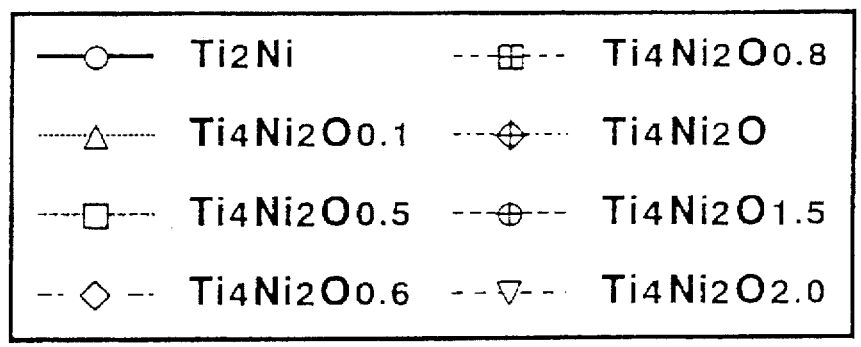

HYDROGEN OCCLUSION ELECTRODE

BACKGROUND OF THE INVENTION

The present invention relates to a hydrogen occlusion electrode suitable for use as an electrode for a nickel-hydride battery or the like and, more particularly, to a hydrogen occlusion electrode which has high capacity and is superior in high-rate discharge characteristic.

Nickel-hydride (Ni—MH) batteries can be manufactured as batteries having constructions which are similar to those of nickel-cadmium (Ni—Cd) batteries, but in which cadmium negative electrodes are replaced with electrodes made of a hydrogen occlusion alloy. In other words, since production techniques for conventional alkali secondary batteries can be applied to the production of such a nickel-hydride battery without any modification, the nickel-hydride battery is advantageous in cost and has attracted much attention as a battery which can be applied to a wide variety of fields.

Rare earth $AB_5$ type alloys, Laves phase $AB_2$ or AB type alloys containing titanium or aluminum, $A_2B$ type alloys and the like are known as hydrogen occlusion alloys which can be used for the aforesaid nickel-hydride battery. In particular, a $Ti_2Ni$ alloy which is one of the $A_2B$ type alloys is superior in that its amount of occlusion of hydrogen is theoretically large.

However, electrodes which employ such $Ti_2Ni$ alloys have rarely be used in practice because of a number of problems such as low discharge capacity (approximately 180 mAh/g) due to low coefficient of use, slow activation and lack of the capability to achieve a high discharge rate.

SUMMARY OF THE INVENTION

An object of the present invention is to provide a hydrogen occlusion electrode which has high capacity and is superior in high-rate discharge characteristic.

The present inventors conducted intensive research in light of the above-described problems of the prior art and accomplished the present invention by finding out that it was possible to achieve the above object by introducing a particular element into $Ti_2Ni$ alloys.

The hydrogen occlusion electrode according to the present invention is characterized by comprising as a constituent element a formed body made of a mixture powder including a titanium-nickel alloy which contains oxygen.

If oxygen is introduced into a titanium-nickel alloy in this manner, the network of a TiNi phase having superior electrode characteristics is formed at grain boundaries. Accordingly, a secondary battery using such an electrode has advantages such as superior charging efficiency and hence high capacity, high-rate discharge and a reduced number of activation cycles.

If Zr or another particular element is substituted for part of the titanium-nickel alloy into which oxygen is introduced, it is also possible to provide an electrode or battery having desired discharge characteristics. Such a hydrogen occlusion electrode can be suitably used as an electrode (negative electrode) for an alkali secondary battery or the like.

BRIEF DESCRIPTION OF THE DRAWINGS

FIG. 5 is a view showing the relation between the discharge capacity and the changes of the discharge current of $Ti_4Ni_2O_x$ alloy;

DETAILED DESCRIPTION OF THE PREFERRED EMBODIMENTS

Figure 1:
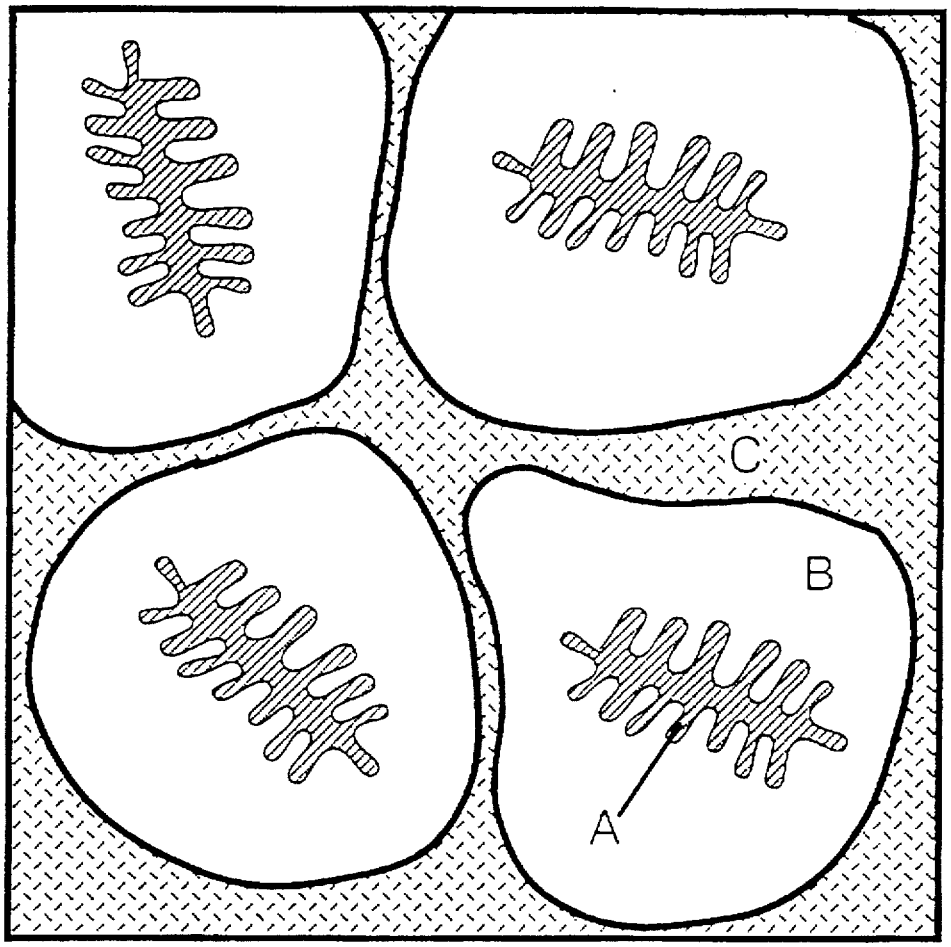
FIG. 1 is a view showing an image of the microstructure of a hydrogen occlusion electrode according to the present invention.

The hydrogen occlusion electrode according to the present invention uses as a constituent element a formed body made of a mixture powder including a titanium-nickel alloy which contains oxygen.

The titanium-nickel alloy which contains oxygen may be any type of $Ti_2Ni$ alloy into which oxygen (atoms) is introduced, and desirably has a composition represented by the general formula $Ti_4Ni_2O_x$ ($0.1 \leq x \leq 1.0$, particularly $0.3 \leq x \leq 0.8$). In other words, oxygen needs to be introduced into a titanium-nickel alloy so that such composition can be obtained. If the oxygen content x is less than 0.1, the effect of introduction of oxygen is insufficient, whereas if the oxygen content x exceeds 1.0, the hydrogen dissociation pressure of the hydrogen occlusion electrode exceeds a pressure of 1 atm, so that, undesirably, its charge efficiency decreases and a decrease in its capacity is caused.

In the present invention, it is desirable that the titanium-nickel alloy which contains oxygen have a microstructure in which a TiNi phase is precipitated at a grain boundary of a $Ti_2Ni$ phase ($Ti_4Ni_2Ox$ described above) which contains oxygen. Such microstructure is capable of improving in discharge characteristics or the like. It is particularly desirable that the titanium-nickel alloy which contains oxygen have a microstructure in which a titanium phase containing oxygen in the form of solid solution is contained in a crystal grain of a $Ti_2Ni$ phase which contains oxygen, and a TiNi phase be precipitated at the grain boundary of the $Ti_2Ni$ phase.

The titanium phase in which oxygen is dissolved in the form of solid solution maintains metallic characteristic and has a composition represented by the general formula $TiO\alpha$. $\alpha$ is normally approximately 0.5 or less, preferably 0.3 or less. If $\alpha$ exceeds 0.5, $TiO$, $Ti_2O_3$ and the like that have an electric insulating property is undesirably precipitated as an oxide phase.

Zr may also be substituted for part of Ti of the oxygen-containing titanium-nickel alloy which constitutes the hydrogen occlusion electrode according to the present invention. The amount of substitution of Zr (y) can be arbitrarily determined so as to take account of the desired amount of occlusion of hydrogen, the number of activation cycles and the like, and such amount y may normally be determined so as to form a composition represented by the general formula $Ti_{4-y}Zr_yNi_2O_x$ ($0.1 \leq x \leq 1.0$, $0 < y \leq 1.0$, preferably $0.2 \leq y \leq 0.8$).

Furthermore, in the present invention, other elements (M) may also be substituted for part of Ni. Although the other elements (M) are not limited to particular elements, for example if Mn, Fe, Co, Cu, V, Cr or the like is employed, a desired hydrogen dissociation pressure, desired electrode characteristics and the like can be obtained. Only one kind selected from these elements may be used, or two or more kinds selected therefrom may be used in combination. The amount of substitution may be adjusted to form a composition represented by the general formula $Ti_{4-y}Zr_yNi_{2-z}M_zO_x(0.1 \leq X \leq 1.0, 0<y \leq 1.0, 0<Z \leq 1.0)$. If the amount of substitution z exceeds 1.0, the proportion of Ni which serves as an electrode catalyst undesirably relatively decreases.

The mixture powder of the present invention may include various additives such as conductive auxiliaries, so long as they do not impair the effect of the present invention. The conductive auxiliaries may be known powders such as copper powder, carbonyl nickel powder, cobalt powder and carbon powder. Only one kind selected from these powders may be used, or two or more kinds selected therefrom may be used in combination. The content of such a conductive auxiliary, which may be arbitrarily determined according to the kind of alloy powder to be used, the kind of conductive auxiliary and the like, is normally approximately 5–50 weight parts, preferably 10–30 weight parts, with respect to 100 weight parts of titanium-nickel alloy which contains oxygen.

The mixture powder may further contain a polymer binder such as polytetrafluoroethylene (PTFE) or styrene-containing thermoplastic elastomer (SEBS).

The hydrogen occlusion electrode of the present invention can be prepared, for example, in the following manner. First, a material power such as Ti powder, Ni powder or NiO powder is fully mixed and formed so that the aforesaid predetermined amount of oxygen can be introduced. Then, the formed body of the mixture powder is melted, and the obtained pellet-shaped material is ground. The thus-obtained powder may be formed into an electrode in accordance with a known electrode producing method.

Those material powders may be known materials or commercially available products. The material powders may have a grain size of normally approximately 1–150 μm, preferably 10–50 μm. An oxygen introducing source may be an oxide of titanium, such as $TiO\alpha$ ($\alpha<2$), or an oxide of transition metal, such as $MnO_2$, $Fe_3O_4$, $CoO$, $V_2O_3$ or $Cr_2O_3$.

The mixture powder may be prepared by using a mixer which is generally used in the field of powder metallurgy. Specifically, an automated morter, a ball mill, a vibrating mill, an attritor or the like may be used. In the present invention, a mechanofusion type of mixer (for example, a product of Hosokawa Micron Corp. is commercially available) may also be employed. Although the operation conditions of the mechanofusion type of mixer are not limited to particular conditions, its normal rotational speed may be normally approximately 300–900 rpm and its mixing time may be approximately 120 seconds to approximately 5 minutes.

The aforesaid alloy may be melted by using a known arc melting furnace, a high frequency melting furnace or the like. Although operation conditions for melting the alloy may be arbitrarily altered according to the composition of a material or desired characteristics, the alloy may normally be melted in an atmosphere of an inert gas (such as argon, helium or nitrogen) or in a vacuum.

The pellet-shaped material obtained by melting may be ground by a known grinding method using an automated mortar, a ball mill, a vibrating mill, an attritor or the like, and the final grain size may be normally approximately 10–100 μm, preferably 30–80 μm.

Then, a conductive auxiliary or the like is added to and fully mixed with the thus-obtained powder, as required, and the obtained mixture can be formed into an electrode in accordance with a known dry press method or a wet process.

For example, the alloy material powder or the mixture powder obtained by grinding the pellet-shaped material is put into a die, and after the mixture powder is temporarily compressed by a roller or the like and is charged into the die, the charged material may be formed by pressure into a sheet-shaped electrode on a conductive material such as a nickel mesh. Incidentally, during the roller compression, if necessary, the required amount of alloy material powder, mixture powder or paste of those powders may be set on a current collector (for example, a metal mesh such as nickel mesh, punched sheet steel, nickel expanded metal and the like) and be charged into the die while being roller-compressed.

Also, the temporary formed body of the alloy material powder or the mixture powder may be compressed further by isotropic compression (SIP) using rubber pressure or hydrostatic pressure, isotropic compression (HIP) using gas pressure and the like. The forming pressure is normally approximately 5–500 MPa per a unit area, preferably approximately 100–300 MPa, but not limited to a particular pressure.

If oxygen is introduced into a $Ti_2Ni$ alloy in the above-described manner, a titanium phase in which oxygen is dissolved in the form of solid solution is precipitated as a dendritic primary crystal and the crystal grains of a $Ti_4Ni_2O_x$ alloy which includes the titanium phase and contains oxygen are produced, and a microstructure in which a TiNi phase is precipitated at the grain boundaries between the crystal grains is formed. The TiNi phase precipitated at the grain boundaries mainly acts as a current collector and an electrode catalyst, so that discharge performance and the like can be improved.

In the case of a Ti—Ni alloy, it is common sense that since its TiNi phase has a solidification temperature higher than its $Ti_2Ni$ phase, the $Ti_2Ni$ phase is precipitated at the grain boundary of the TiNi phase. It is generally believed that the $Ti_2Ni$ phase occludes a large amount of hydrogen, but is inferior in electrode activity because of its small nickel content, and the passivity of Titanium easily occurs and lowers electrode characteristics.

In contrast, in accordance with the present invention, by introducing oxygen into the $Ti_2Ni$ alloy, the $Ti_2Ni$ phase which has a solidification temperature higher than the TiNi phase and contains oxygen is precipitated, so that the TiNi phase which is superior in electrode activity is precipitated to coat the surface of the crystal grains of the $Ti_2Ni$ phase, thereby successfully improving discharge performance. In other words, the introduction of oxygen improves the hydrogen occlusion characteristic of the $Ti_2Ni$ phase and changes the microstructure thereof into a structure best suited to an electrode material.

EXAMPLE

First, a hydrogen occlusion electrode according to the present invention and a battery using the same were produced in the following manner.

(1) Material of Electrode

The following oxygen-containing titanium-nickel alloy materials were used:

Ti powder (manufactured by Kojundo Kagaku Kenkyusho; 99.9% in purity, smaller than 100 mesh (150 μm) in grain size);

NiO powder (manufactured by Kojundo Kagaku Kenkyusho; 99% in purity, smaller than 7 μm in grain size);

Ni powder ("Ni powder 210" manufactured by INCO; smaller than 10 μm in grain size); and Zr powder (manufactured by Kojundo Kagaku Kenkyusho; 98% in purity, smaller than 150 μm in grain size).

The following electrode materials were used:

Cu powder (manufactured by Fukuda Kinzoku Hakufun Kogyo K.K.; not greater than 2.3 μm in average grain size, 5,100 cm²/g in specific surface area); and a collector (Ni mesh; 0.06 mm in wire diameter, 150 mesh).

(2) Preparation of Alloy Material Powder

The aforesaid Ti powder, NiO powder, Ni powder and Zr powder were weighed in accordance with the weighing values shown in Table 1, thereby preparing a $Ti_4Ni_2O_x$ alloy powder and a $Ti_{4-y}Zr_yNi_2O_x$ alloy powder.

First, after each of the material powders was weighed by using an even electrobalance, it was mixed in an agate mortar for 10 minutes so as to uniformly mix its components. The mixture powder was pelletized by being held under a forming pressure of 7.96 tonf/cm² (781 Mpa) for 10 minutes by means of a pelleting machine ("202-32010" manufactured by Shimadzu Corp.) of 13 mm in diameter. The obtained pellet was melted in a high-purity Ar atmosphere by using an arc melting furnace ("NAF-361-63" manufactured by Nippon Tokushu Kikai K.K.), whereby a button-shaped sample alloy was obtained.

Table 2 shows the element analysis values of each of the thus-obtained button-shaped sample alloys. In the analysis of oxygen and nitrogen, an oxygen and nitrogen analyzer ("TC136" manufactured by LECO) was employed. Each of the sample alloys was melted above 3,000° C. to convert the contained oxygen into $CO_2$, and $CO_2$ was quantitatively measured by means of an infrared detector. Nitrogen was quantitatively measured by means of a heat-conductivity detector. In one analysis of oxygen, approximately 0.1 g of sample was roughly ground to 30–50 mesh. Regarding the aforesaid arc melting, rough grinding was performed after arc melting, and this process was repeated three times. Regarding the sample of $Ti_4Ni_2O_{2.0}$*, arc melting was repeated another three times. Referring to Table 2, if oxygen and titanium or the like are not dissolved in a metal in the form of solid solution but precipitated as an oxide (such as $TiO_2$ and $Ti_2O_3$), oxygen cannot be analyzed, so that the oxygen analysis value is apparently greatly reduced compared to the amount of introduction of oxygen for x=2.0 and x=2.0*.

TABLE 1

| Name of Sample | Ti (g) | Ni (g) | NiO (g) |
|---|---|---|---|
| $Ti_2Ni$ | 6.2001 | 3.7999 | 0 |
| $Ti_4Ni_2O_{0.5}$ | 3.0218 | 0.5891 | 1.3891 |
| $Ti_4Ni_2O$ | 2.3578 | 0.7226 | 0.9195 |
| $Ti_4Ni_2O_{1.5}$ | 2.8766 | 0.4408 | 1.6827 |
| $Ti_4Ni_2O_{2.0}$ | 2.8091 | 0 | 2.6911 |

NiO was weighed on the following conditions:
Ni:O=78.58:21.42,
Ni=0×78.58/21.42,
NiO=0×78.58/21.42+0.

TABLE 2

| Name of Sample | Amount of Introduction of Oxygen (ppm) | Oxygen Analysis Value (ppm) | Ratio of Introduction of Oxygen (%) | Nitrogen Analysis Value (ppm) |
|---|---|---|---|---|
| $Ti_2Ni$ | 0 | 632 | — | 12 |
| $Ti_4Ni_2O_{0.5}$ | 25244 | 27610 | 109.4 | 163 |
| $Ti_4Ni_2O$ | 49244 | 44500 | 90.4 | 181 |
| $Ti_4Ni_2O_{1.5}$ | 72091 | 72630 | 100.7 | 159 |

TABLE 2-continued

| Name of Sample | Amount of Introduction of Oxygen (ppm) | Oxygen Analysis Value (ppm) | Ratio of Introduction of Oxygen (%) | Nitrogen Analysis Value (ppm) |
|---|---|---|---|---|
| $Ti_4Ni_2O_{2.0}$ | 93866 | 75250 | 80.2 | 188 |
| $Ti_4Ni_2O_{2.0}$* | 93866 | 43270 | 46.1 | 255 |

In addition, the $Ti_4Ni_2O_x$ powder was analyzed by means of a scanning electron microscope and wavelength dispersive X-ray spectroscope. FIG. 1 is a view showing the image obtained from this analysis. In FIG. 1, "A" denotes a titanium phase in which oxygen is dissolved in the form of solid solution (TiOα), "B" denotes a $Ti_2Ni$ phase which contains oxygen ($Ti_4Ni_2O_x$), and "C" denotes a TiNi phase (grain boundary).

(3) Production of Electrode

A hydrogen occlusion electrode was produced from an alloy material powder in the following manner. The powder obtained by grinding the aforesaid button-shaped sample alloy and copper powder were weighed at a mass ratio of 1:3, and were mixed for 5 minutes by means of an mortar so as to uniformly mix their components. Then, 1 g of the mixture powder was pelletized by being held under a forming pressure of 7.96 tonf/cm² (781 Mpa) for 10 minutes by means of the aforesaid pelleting machine of 13 mm in diameter. Then, the obtained alloy pellet was sandwiched between Ni meshes and all of them were spot-welded together along its periphery, and Ni wire was attached to the obtained product, thus preparing a hydrogen occlusion electrode. A negative electrode made from the hydrogen occlusion electrode, a sintered Ni positive electrode and a three-chamber cell made of Pyrex were employed to produce an open type test battery using Hg/HgO as a reference electrode.

Then, the aforesaid battery was employed to measure the equilibrium characteristic (electrochemical PCT) of the alloy electrode, the cycle lifetime characteristic of the alloy electrode and the high-rate discharge characteristic thereof.

(A) Equilibrium Characteristic (Electrochemical PCT) of Alloy Electrode

The aforesaid battery cell was electrically charged and saturated by using a constant direct current source ("HJ-201B:PCT" manufactured by Hokuto Denko). The battery cell was discharged in a pulsed manner (at 8 mA/g for 1 hour) under the following conditions, and the equilibrium potential (E) of the battery cell after a discharge stop period (30 minutes) was measured. This process was repeated.

<Charge and Discharge Conditions>

$Ti_4Ni_2O_x$ charging current: 5 mA (current density per g of the alloy, 20 mA/g), charging time: 20 hours, charging capacity: 400 mAh/g (electric capacity per g of the alloy), pausing time of charge: 30 minutes, discharge current: 2 mA (8 mA/g), final discharge voltage: −0.60 V vs. the reference electrode of mercury oxide (Hg—HgO), and pausing time of discharge: 30 minutes.

$Ti_{4-y}Zr_yNi_2O_x$ charging current: 5 mA (20 mA/g), charging time: 25 hours, charging capacity: 500 mAh/g, pausing time of charge: 30 minutes, discharge current: 2 mA (8 mA/g), final discharge voltage: −0.60 V vs. Hg—HgO, and pausing time of discharge: 30 minutes.

Then, the obtained equilibrium potential was converted into an equilibrium hydrogen dissociation pressure by using the following Nernst equation, thereby finding equilibrium hydrogen dissociation pressure-composition isothermal lines (electrochemical PCT curves).

<Relation between Equilibrium Electrode Voltage and Equilibrium Hydrogen Dissociation Pressure (Nernst Equation)>

$E(H_2O/H_2) - E(HgO/Hg) = E_o(H_2O/H_2) - E_o(HgO/Hg) + (RT/2F)\ln[a(H_2O)/a(H_2)] = E_o(H_2O/H_2) - E_o(HgO/Hg) + (RT/2F)\ln[a(H_2O)/\gamma(H_2)P(H_2)]$ $E_o(H_2O/H_2)$: standard electrode potential, $a(H_2O)$: activity of $H_2O$, $\gamma(H_2)$: fugacity coefficient of $H_2$, $P(H_2)$: equilibrium hydrogen dissociation pressure.

Since the amount of occlusion of hydrogen can be calculated by the following equation on the basis of the electric capacity calculated from the amount of discharge current and the discharge time, the amount of occlusion of hydrogen is shown as the number of hydrogen atoms (H/M) per atom which constitutes the hydrogen occlusion alloy.

<Relation between H/M and Electric Capacity C (Faraday's law)>

$H/M = (3.6 \times C \times Mav)/F$

F: Faraday constant,

Mav: average atomic weight of atoms which constitute hydrogen occlusion alloy.

(B) Cycle Lifetime and High-Rate Discharge Characteristic of Alloy Electrode

The battery cell was connected to a charge and discharge testing apparatus ("TOSCAT-3000U" manufactured by TOYO SYSTEM), and a cycle consisting of charge, stop and discharge was repeated ten times under the following conditions, and the progress status of activation was examined from a change in the capacity of the battery cell in each of the ten cycles. After that, discharge potential curves were plotted with respect to different discharge currents of 40 mA/g, 100 mA/g, 200 mA/g and 400 mA/g as current density per g of the alloy, and the high-rate discharge characteristic of the battery cell was measured.

<Charge and Discharge Conditions> charging current: 25 mA (current density, 100 mA/g), charging time: 4 hours, pausing time of charge: 4 hours, discharge current: 25 mA (current density, 100 mA/g), and final discharge voltage: −0.60 V vs. Hg—HgO.

TEST EXAMPLE 1

Figure 2:
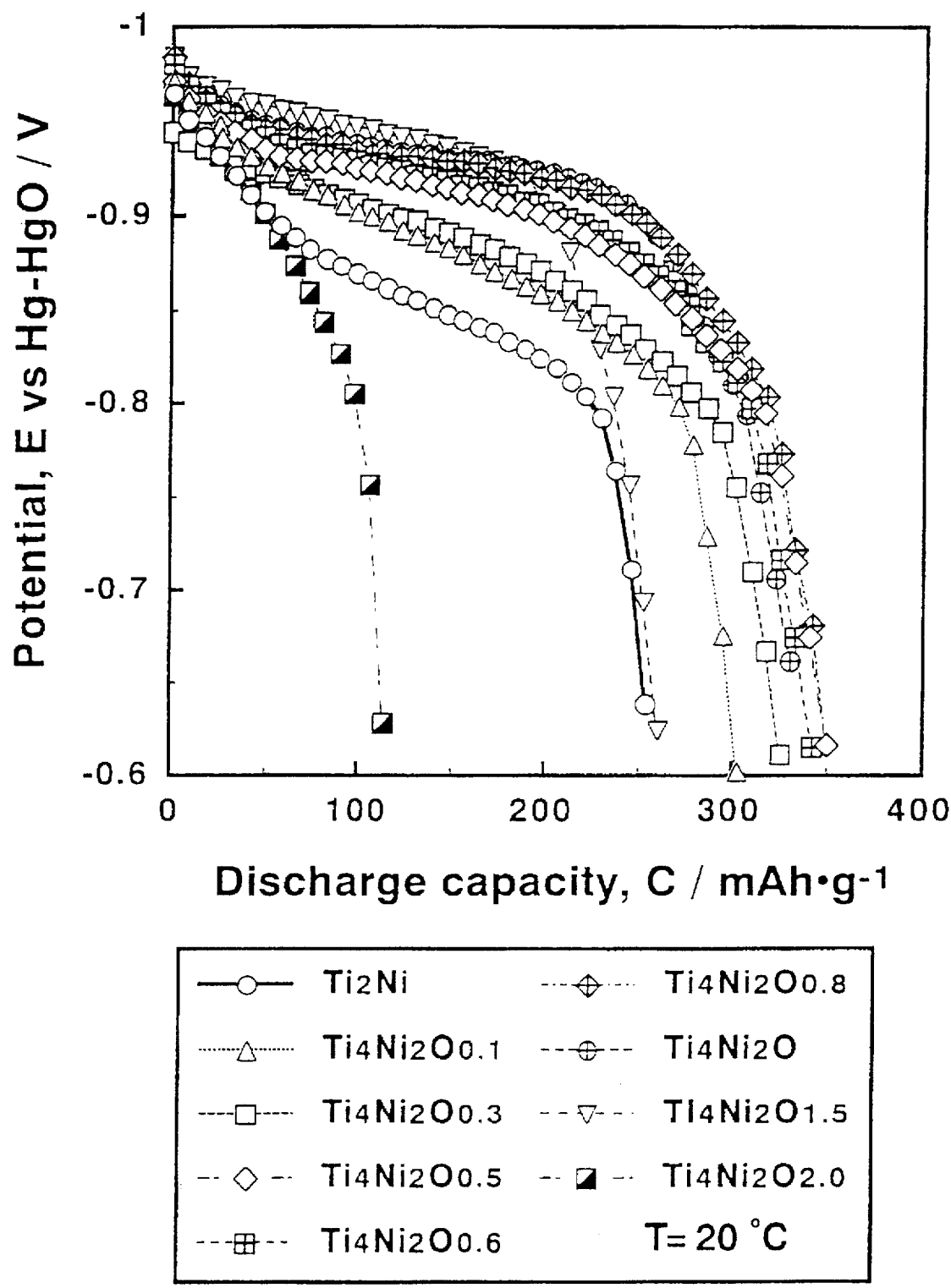
FIG. 2 is a view showing the relation between the equilibrium potential and the electric capacity of a $Ti_4Ni_2O_x$ alloy.

The electrochemical equilibrium characteristic of $Ti_4Ni_2O_x$ was examined. FIG. 2 shows the relation between the equilibrium potential and the electric capacity of $Ti_4Ni_2O_x$. As the oxygen content increases, the electric capacity increases, and when x=0.5, the electric capacity exhibits its maximum value of 350 mAh/g, but if x exceeds 1.0, the electric capacity tends to greatly decrease.

This fact indicates that a high electric capacity (i.e., a large amount of occlusion of hydrogen) can be attained in the $Ti_4Ni_2O_x$ phase obtained by introducing oxygen into the $Ti_2Ni$ phase. If the oxygen content was x>1, the extent of phase splitting into $TiO_x$ and $TiNi$ phases increased and the amount of occlusion of hydrogen decreased.

Figure 3:
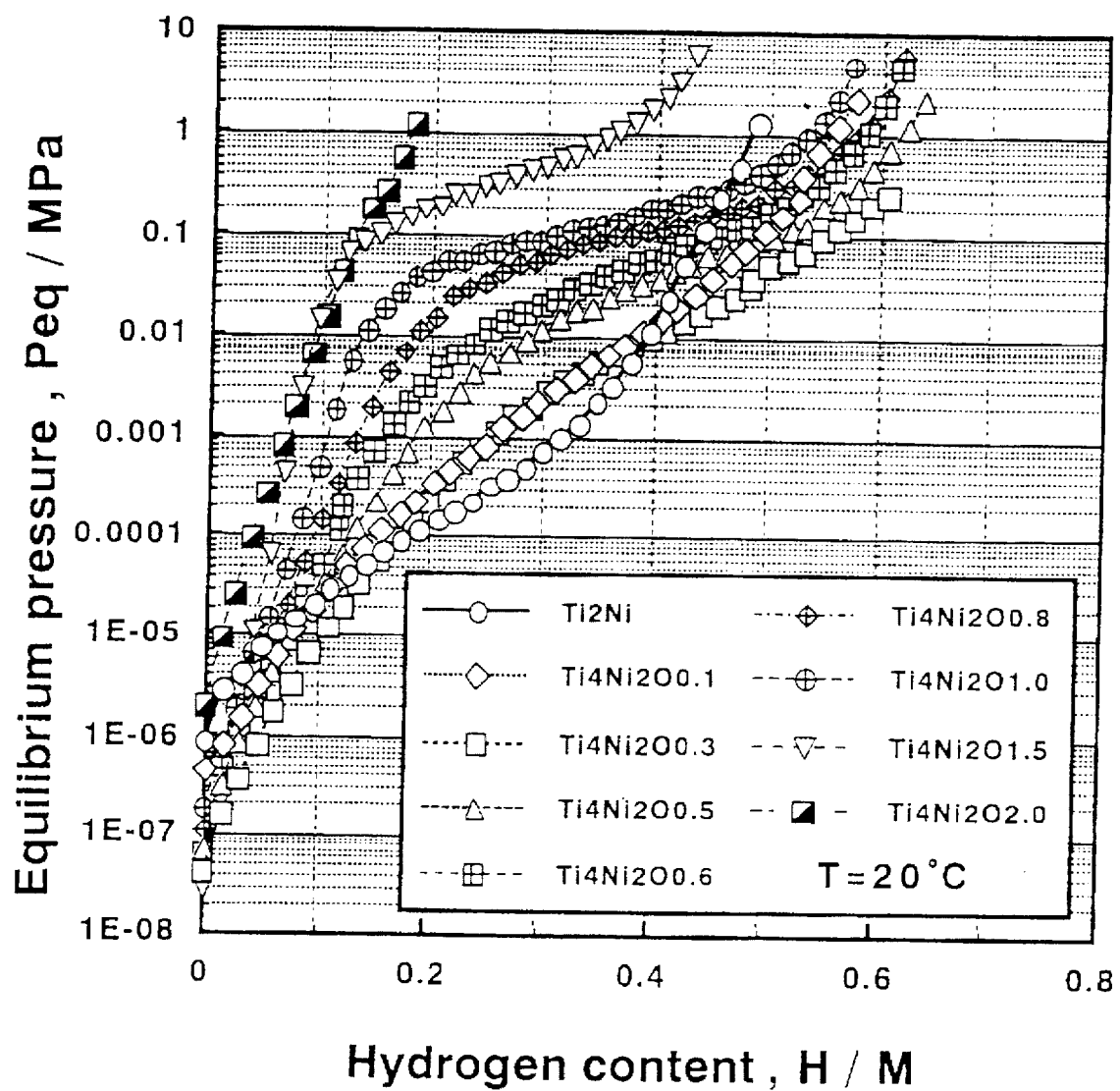
FIG. 3 is a view showing the relation between the equilibrium hydrogen pressure and the amount of occlusion of hydrogen of the $Ti_4Ni_2O_x$ alloy.

FIG. 3 shows the electrochemical PCT curves obtained by converting the equilibrium potential of FIG. 2 into an equilibrium hydrogen pressure and by converting the electric capacity of FIG. 2 into the hydrogen content. The maximum amount of occlusion of hydrogen is near H/M= 0.6, which indicates that even $Ti_4Ni_2OH_{4.2}$ occluded hydrogen. The equilibrium hydrogen dissociation pressure increased with an increase in the oxygen content, and a plateau-like region was observed when x=0.5–1.0. It can be seen from this result that the equilibrium hydrogen pressure sharply increases with an increase in the oxygen content.

TEST EXAMPLE 2

Figure 4:
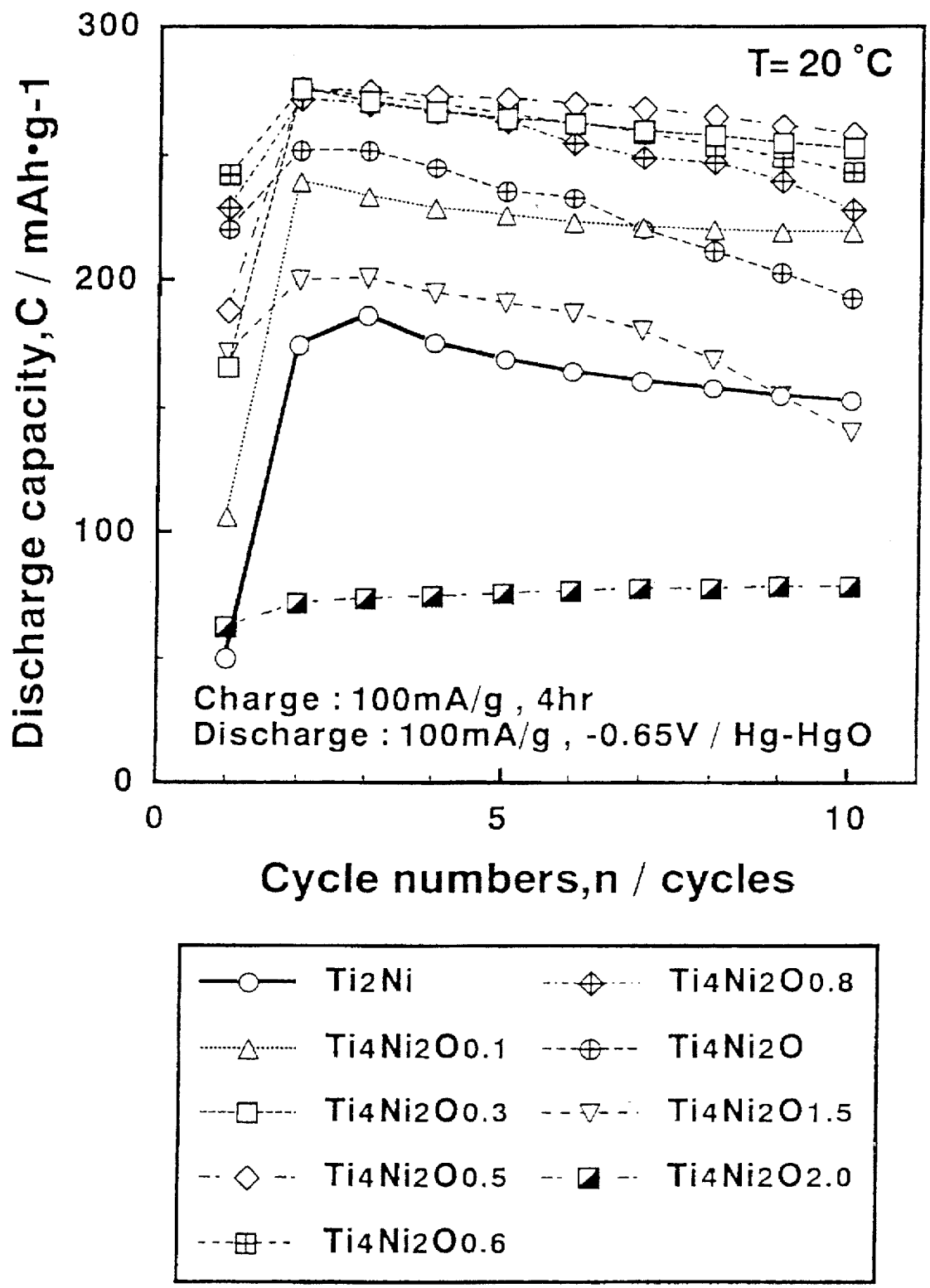
FIG. 4 is a view showing the relation between the discharge capacity and the cycle changes of the $Ti_4Ni_2O_x$ alloy.

A charge and discharge cycle test of $Ti_4Ni_2O_x$ was performed. FIG. 4 shows cycle changes in the discharge capacity. As the oxygen content increased, activation became easier and the maximum discharge capacity increased, and when x=0.3, a capacity of 280 mAh/g was obtained. When x exceeded 1.0, the tendency for the maximum discharge capacity to decrease greatly was observed. Particularly when x=2.0 (the extent of phase splitting was large), a capacity of as small as 80 mAh/g was only obtained. It can be seen from this result that the optimum value of the oxygen content which satisfies a particularly superior discharge capacity and cycle lifetime is x=0.3–0.8.

TEST EXAMPLE 3

The high-rate discharge characteristic of $Ti_4Ni_2O_x$ was examined. FIG. 5 shows current changes in the discharge capacity of $Ti_4Ni_2O_x$. $Ti_2Ni$ had an inferior high-rate discharge characteristic, and was only able to show a discharge capacity of as small as 40 mAh/g for a current density of 40 mA/g. The high-rate discharge characteristic of $Ti_4Ni_2O_x$ increased with an increase in the oxygen content, and showed its maximum value when x=0.5. A discharge capacity of 200 mAh/g was obtained even at a current density of 400 mA/g.

TEST EXAMPLE 4

From FIG. 3, it was found out that when the oxygen content was $x \geq 1.0$, the average hydrogen dissociation pressure exceeded a pressure of 1 atm, and the charging efficiency lowered and the electric capacity lowered. On the basis of this finding, experimentally, Zr having an atomic radius larger than Ti was substituted for Ti, thereby enlarging lattice spaces and lowering the equilibrium hydrogen pressure. The oxygen content was fixed to x=1.0 and the Zr content was increased.

Figure 6:
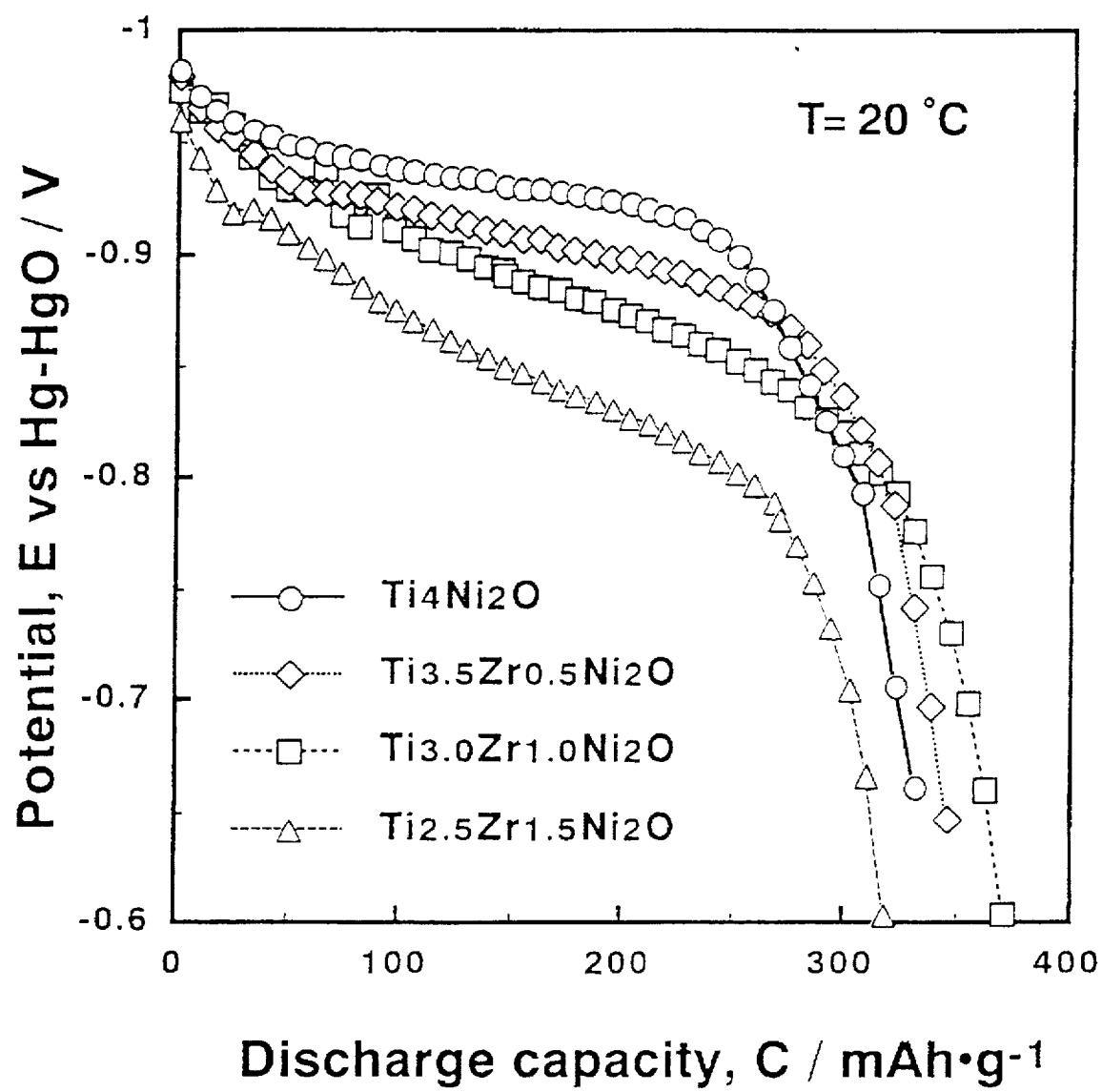
FIG. 6 is a view showing the relation between the equilibrium potential and the electric capacity of a $Ti_{4-y}Zr_yNi_2O$ alloy.
Figure 7:
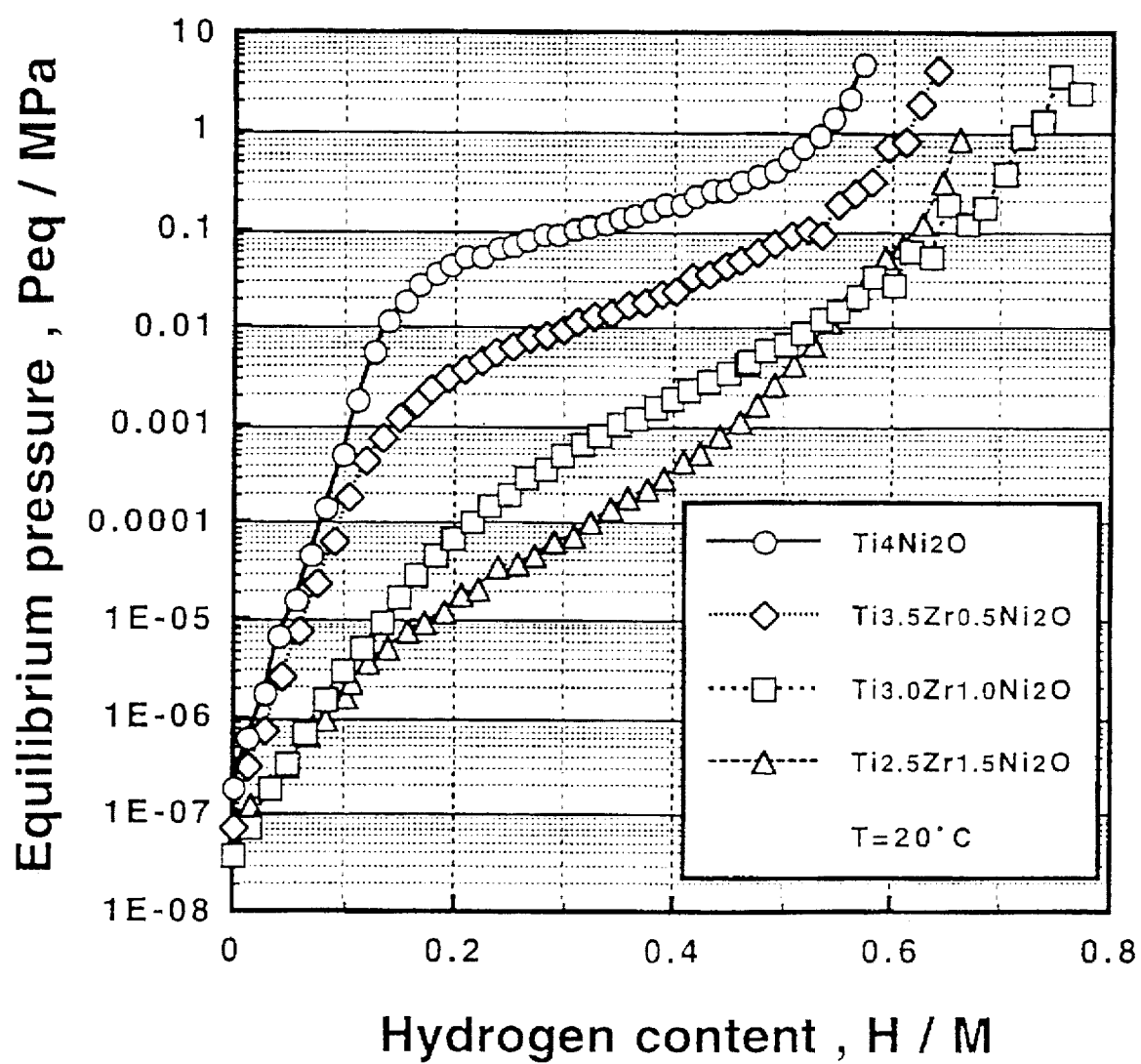
FIG. 7 is a view showing the electrochemical equilibrium hydrogen pressure-composition isothermal lines of the $Ti_{4-y}Zr_yNi_2O$ alloy.

An electrochemical evaluation of $Ti_{4-y}Zr_yNi_2O$ was performed. FIG. 6 shows the relation between the average discharge voltage and the electric capacity of $Ti_{4-y}Zr_yNi_2O$. As the Zr content increased, the equilibrium potential tended to lower. The discharge capacity increased with an increase in the Zr content, and when y=1.0, a discharge capacity of 370 mAh/g was obtained. However, in the case of y=1.5, the discharge capacity rather lowered. FIG. 7 shows equilibrium hydrogen dissociation pressure-composition isothermal lines. The average hydrogen dissociation pressure was 0.1 MPa for y=0, but lowered to 0.0001 MPa by three digits when y=1.5.

Figure 8:
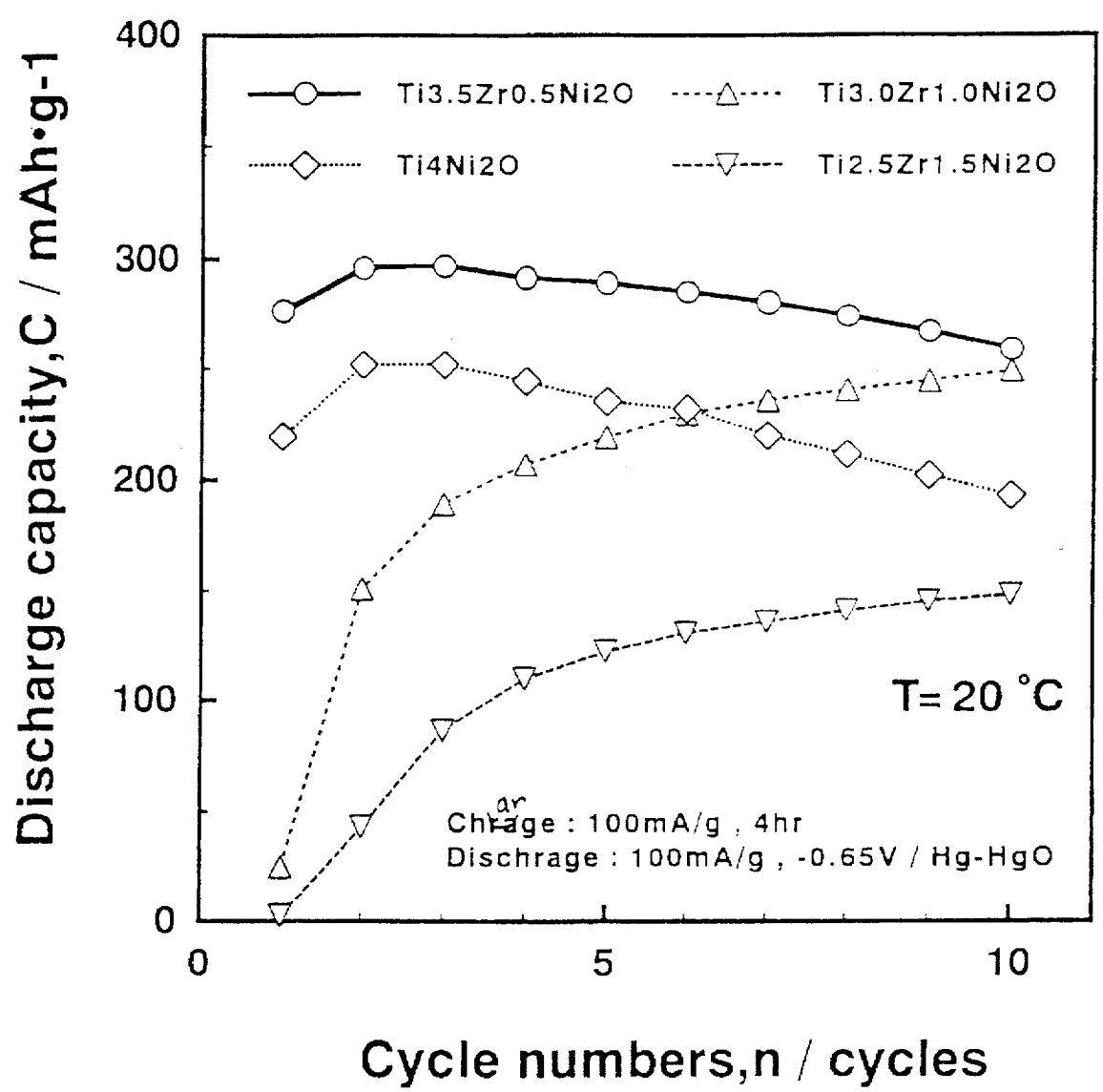
FIG. 8 is a view showing the relation between discharge capacity and the cycle changes of the $Ti_{4-y}Zr_yNi_2O$ alloy.

FIG. 8 shows cycle changes in the discharge capacity. Although the maximum discharge capacity was approximately 250 mAh/g for y=0, it increased up to 300 mAh/g when y=0.5. In addition, as the Zr content increased, the amount of occlusion of hydrogen during equilibrium increased, but the tendency of activation to become slow was observed in the case of a charge/discharge current of 100 mA/g. When y=1.5, a capacity of as small as 150 mAh/g was only obtained even after 10 cycles.

As described above, it was observed that, in the case of the oxygen content x=0.1, an increase in the Zr content lowered the hydrogen dissociation pressure and increased the amount of occlusion of hydrogen, but, in the case of y>0.1, activation became slow and the discharge capacity lowered.

What is claimed is:

1. A hydrogen occlusion electrode comprising a compact of a mixture powder including a titanium-nickel alloy which contains oxygen.

2. A hydrogen occlusion electrode according to claim 1, wherein said oxygen-containing titanium-nickel alloy has a composition represented by the general formula $Ti_4Ni_2O_x$ wherein $0.1 \leq x \leq 1.0$.

3. A hydrogen occlusion electrode according to claim 2, wherein said oxygen-containing titanium-nickel alloy has a microstructure in which a TiNi phase is precipitated at a grain boundary of a $Ti_2Ni$ phase which contains oxygen.

4. A hydrogen occlusion electrode according to claim 2, wherein said oxygen-containing titanium-nickel alloy has a microstructure in which a titanium phase containing oxygen in the form of solid solution is contained in a crystal grain of a $Ti_2Ni$ phase which contains oxygen, and a TiNi phase is precipitated at the grain boundary of said $Ti_2Ni$ phase.

5. A hydrogen occlusion electrode according to claim 4, wherein said titanium phase containing oxygen in the form of solid solution has a composition represented by the general formula $TiO\alpha$ wherein $0<\alpha \leq 0.5$.

6. A hydrogen occlusion electrode according to claim 1, wherein said oxygen-containing titanium-nickel alloy has a composition represented by the general formula $Ti_{4-y}Zr_yNi_2O_x$ wherein $0.1 \leq x \leq 1.0$, $0<y \leq 1.0$.

7. A hydrogen occlusion electrode according to claim 1, wherein said oxygen-containing titanium-nickel alloy has a composition represented by the general formula $Ti_{4-y}Zr_yNi_{2-z}M_zO_x$ wherein $0.1 \leq X \leq 1.0$, $0<y \leq 1.0$, $0<Z \leq 1.0$, and the element M is at least one kind selected from among Mn, Fe, Co, Cu, V and Cr.

* * * * *